US012679496B2

(12) United States Patent　　　(10) Patent No.:　US 12,679,496 B2
Suzuki et al.　　　　　　　　　　(45) Date of Patent:　　Jul. 14, 2026

(54) CONTROL SYSTEM, STRADDLE TYPE VEHICLE, CONTROL METHOD, AND STORAGE MEDIUM

(71) Applicant: HONDA MOTOR CO., LTD., Tokyo (JP)

(72) Inventors: Ryoga Suzuki, Tokyo (JP); Yohei Kawasaki, Tokyo (JP); Yosuke Wada, Tokyo (JP); Ryuta Kikuchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 68 days.

(21) Appl. No.: 18/884,658

(22) Filed: Sep. 13, 2024

(65) Prior Publication Data

US 2025/0108878 A1　　Apr. 3, 2025

(30) Foreign Application Priority Data

Sep. 29, 2023　(JP) ................................. 2023-170820

(51) Int. Cl.
B62K 25/28　　　(2006.01)
B62K 25/04　　　(2006.01)

(52) U.S. Cl.
CPC ...... B62K 25/283 (2013.01); B62K 2025/044 (2013.01)

(58) Field of Classification Search
CPC . B62K 25/283; B62K 2025/044; B62K 25/04
See application file for complete search history.

(56) References Cited

U.S. PATENT DOCUMENTS 11,565,564 B2　　1/2023　Murakami
2010/0327542 A1 *　12/2010　Hara ..................... B62K 25/286
　　　　　　　　　　　　　　　　　　　280/5.503

(Continued)

FOREIGN PATENT DOCUMENTS

JP　　　S62-034885 A　　2/1987
JP　　　2010-167907 A　　8/2010

(Continued)

OTHER PUBLICATIONS

Japanese Office Action for Japanese Patent Application No. 2023-170820 mailed on May 9, 2025.

*Primary Examiner* — Joseph J Dallo
(74) *Attorney, Agent, or Firm* — THOMAS | HORSTEMEYER, LLP

(57)　　　　　　ABSTRACT

The present invention provides a control system of a straddle type vehicle including a front suspension mechanism and a rear suspension mechanism, comprising: a detector configured to detect a stroke speed of the front suspension mechanism; a control unit configured to control a damping force of the rear suspension mechanism; a determination unit configured to determine an operation state of the straddle type vehicle; and a transition unit configured to cause a control mode of the rear suspension mechanism controlled by the control unit to transition from a first mode of changing the damping force of the rear suspension mechanism according to a detection result of the detector to a second mode of fixing the damping force of the rear suspension mechanism, when the determination unit determines that the straddle type vehicle is in a predetermined operation state.

13 Claims, 10 Drawing Sheets

(56) References Cited

U.S. PATENT DOCUMENTS

| 2019/0152389 | A1* | 5/2019 | Nakakura | ................. | B62J 3/00 |
| 2020/0017163 | A1* | 1/2020 | Shahana | .................. | B62J 45/41 |
| 2020/0171906 | A1 | 6/2020 | Murakami | | |
| 2020/0247498 | A1* | 8/2020 | Yamamoto | ............ | B62J 45/412 |
| 2022/0194352 | A1* | 6/2022 | Kaneko | ................ | B60W 10/06 |
| 2022/0212641 | A1* | 7/2022 | Takahashi | ............ | B60T 8/1706 |

FOREIGN PATENT DOCUMENTS

| JP | 2012-062947 | A | 3/2012 |
| WO | 2019/077761 | A1 | 4/2019 |

* cited by examiner

FIG. 1

F I G. 3
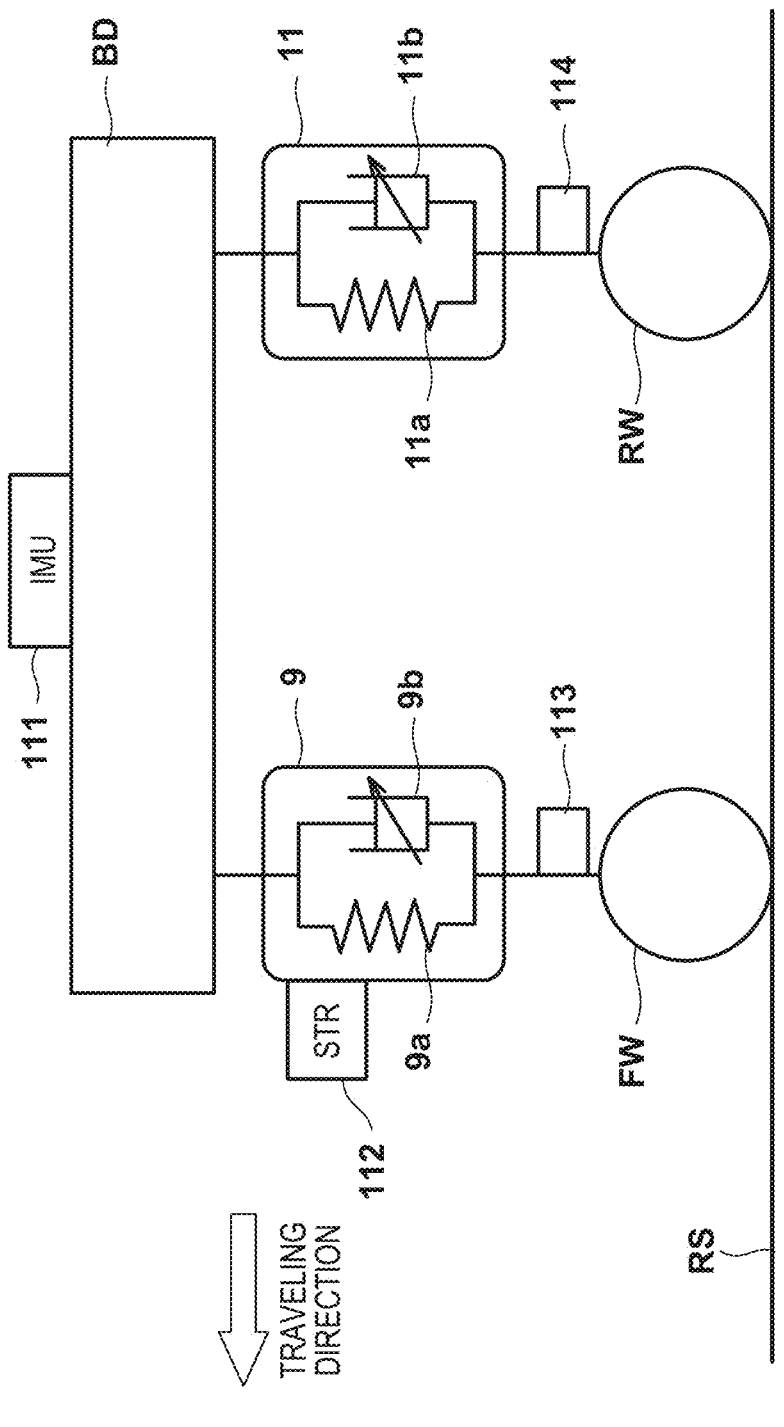

F I G. 4

F I G. 5

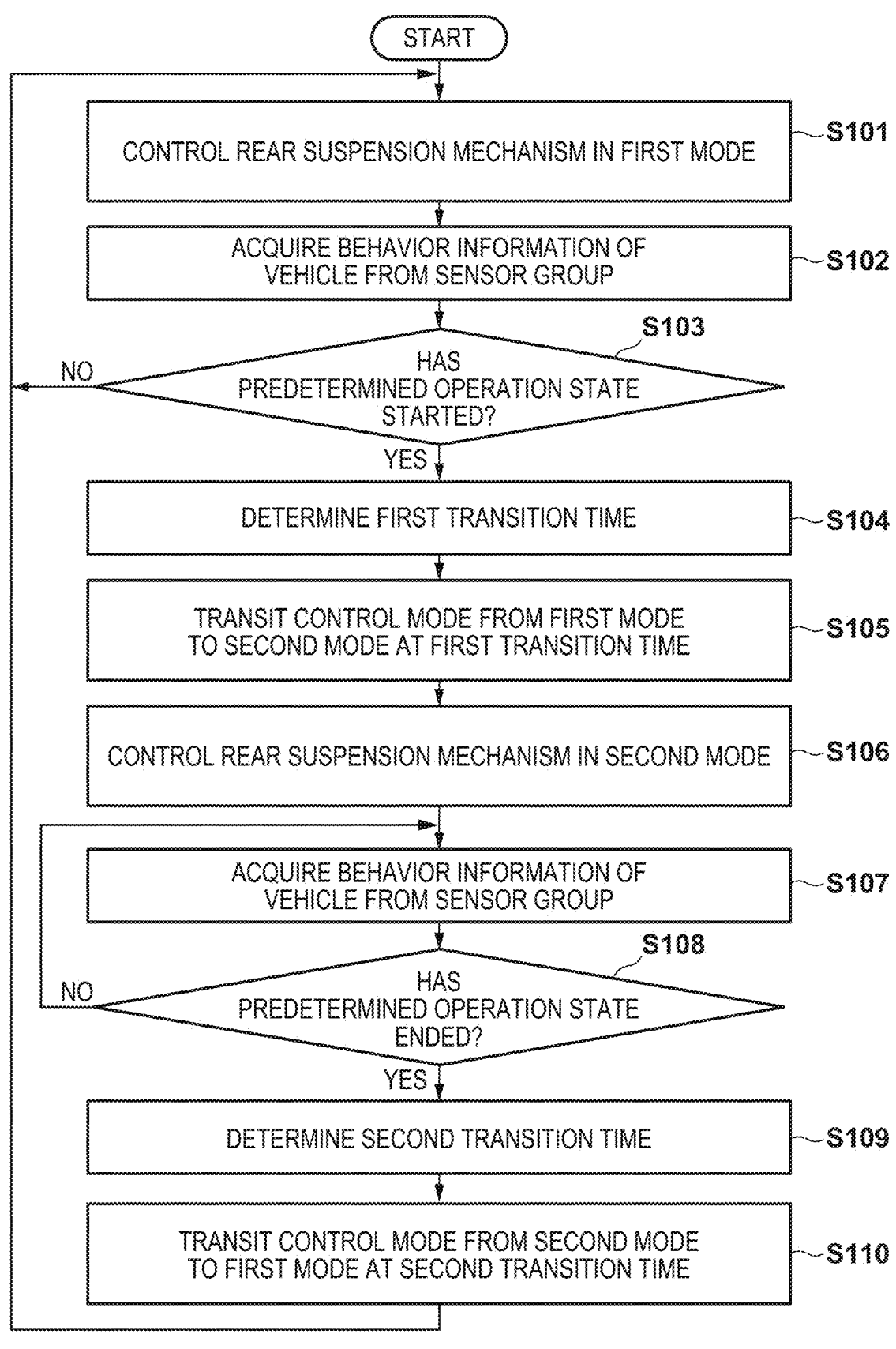

START

CONTROL REAR SUSPENSION MECHANISM IN FIRST MODE — S101

ACQUIRE BEHAVIOR INFORMATION OF VEHICLE FROM SENSOR GROUP — S102

HAS PREDETERMINED OPERATION STATE STARTED? — S103

NO

YES

DETERMINE FIRST TRANSITION TIME — S104

TRANSIT CONTROL MODE FROM FIRST MODE TO SECOND MODE AT FIRST TRANSITION TIME — S105

CONTROL REAR SUSPENSION MECHANISM IN SECOND MODE — S106

ACQUIRE BEHAVIOR INFORMATION OF VEHICLE FROM SENSOR GROUP — S107

HAS PREDETERMINED OPERATION STATE ENDED? — S108

NO

YES

DETERMINE SECOND TRANSITION TIME — S109

TRANSIT CONTROL MODE FROM SECOND MODE TO FIRST MODE AT SECOND TRANSITION TIME — S110

F I G. 6A
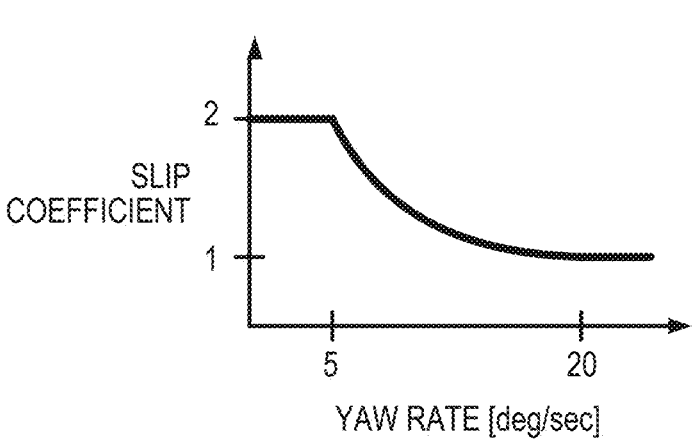
F I G. 6B
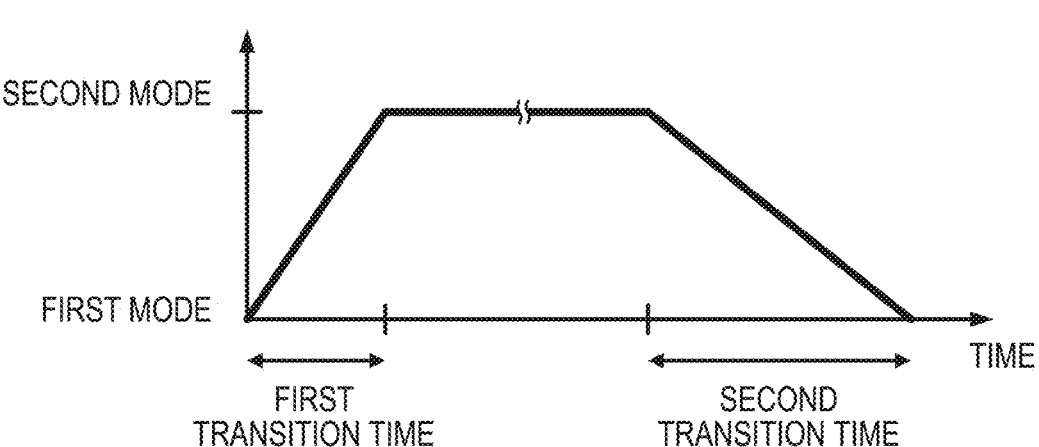

F I G.   9
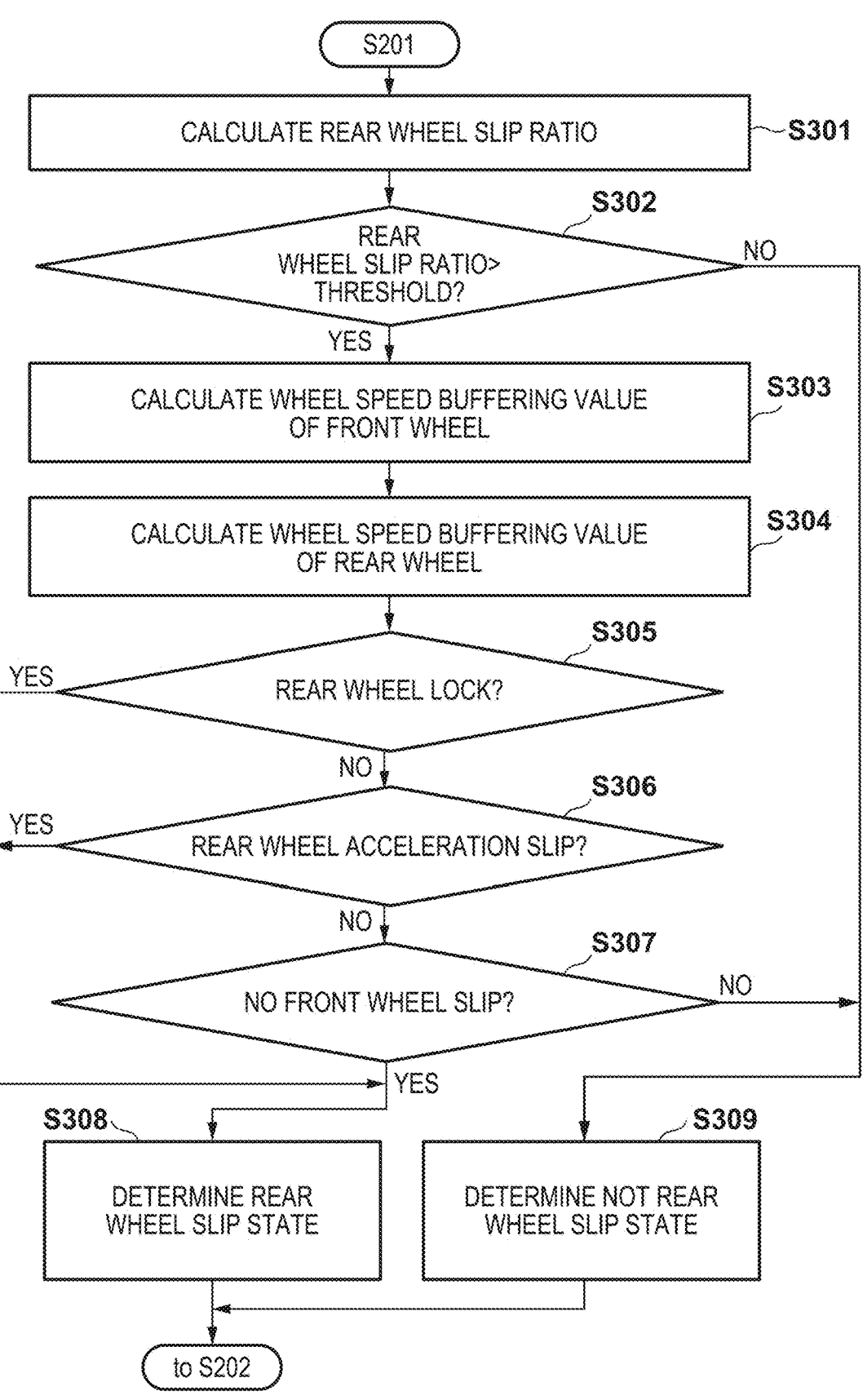

F I G. 10
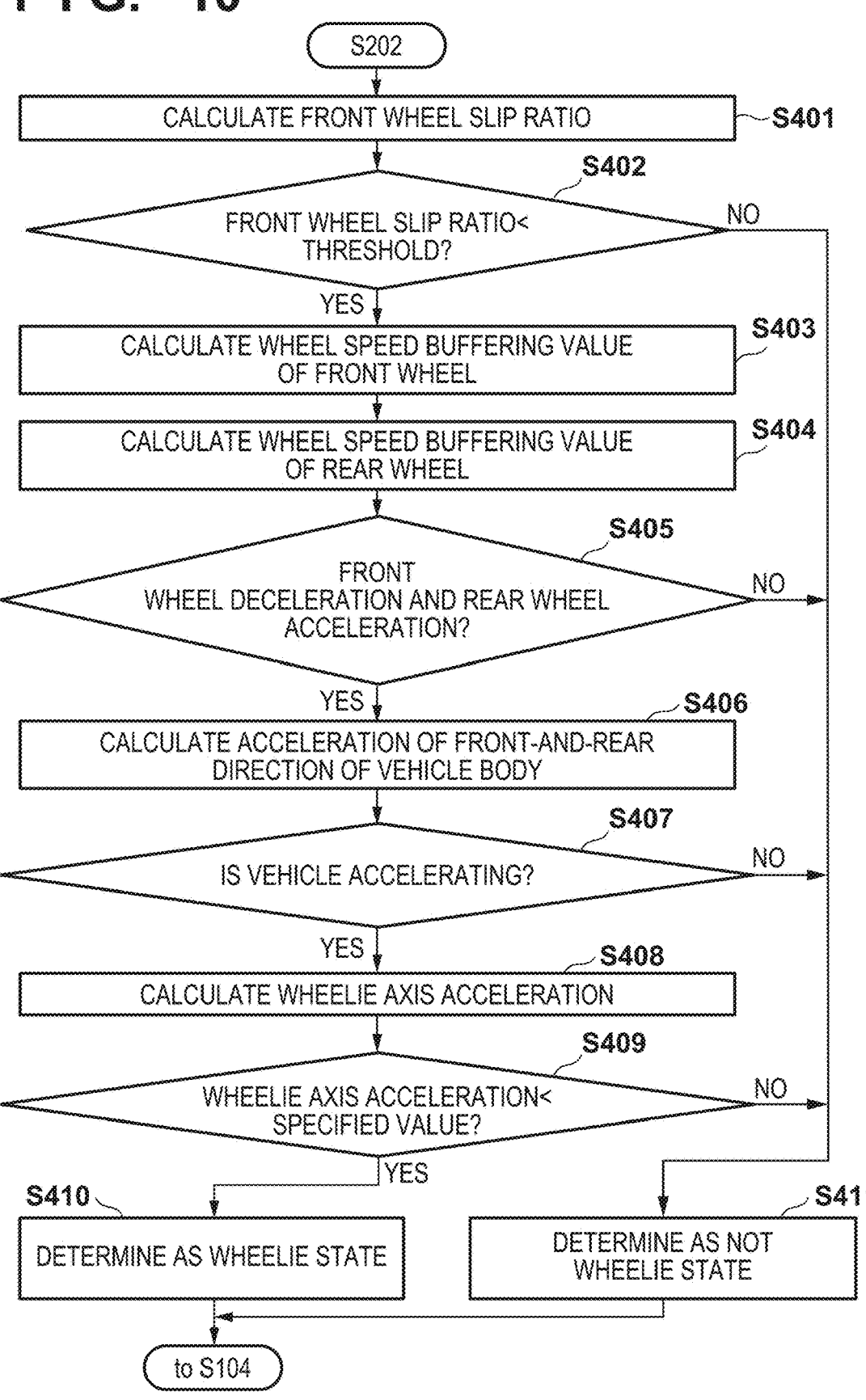

BEFORE WHEELIE

Az cos(θ)

Az

θ

Aw

Ax

θ

RW

FW

TRAVELING
DIRECTION

Ax sin(-θ)

IN WHEELIE (WHEELIE STATE)

G

Az

θy

θ

Aw

Az cos(θ)

Ax

FW

1

TRAVELING
DIRECTION

RW

Ax sin(-θ)

CONTROL SYSTEM, STRADDLE TYPE VEHICLE, CONTROL METHOD, AND STORAGE MEDIUM

CROSS-REFERENCE TO RELATED APPLICATION(S)

This application claims priority to and the benefit of Japanese Patent Application No. 2023-170820 filed on Sep. 29, 2023, the entire disclosure of which is incorporated herein by reference.

BACKGROUND OF THE INVENTION

Field of the Invention

The present invention relates to a control technique of a vehicle.

Description of the Related Art

WO2019/077761A discloses that when it is determined that a vehicle is jumping, the damping force generated between the vehicle body and the wheels by a damping device is made larger compared to when it is not determined that the vehicle is jumping.

In a straddle type vehicle, for example, the stroke speed of a rear suspension mechanism is estimated according to the detection result of the stroke speed of a front suspension mechanism, and the rear suspension mechanism is controlled according to the estimation result. However, in a case where a straddle type vehicle is in a predetermined operation state such as a state where the rear wheel is slipping or a state of doing a wheelie, it may be difficult to estimate the stroke speed that may occur in the rear suspension mechanism based on the detection result of the stroke speed of the front suspension mechanism. Even in such a case, it is desirable to appropriately control the rear suspension mechanism to ensure the vehicle body stability of the straddle type vehicle.

SUMMARY OF THE INVENTION

The present invention provides, for example, an advantageous technique in terms of vehicle body stability of a straddle type vehicle in a predetermined operation state.

According to one aspect of the present invention, there is provided a control system of a straddle type vehicle including a front suspension mechanism and a rear suspension mechanism, comprising: a detector configured to detect a stroke speed of the front suspension mechanism; a control unit configured to control a damping force of the rear suspension mechanism; a determination unit configured to determine an operation state of the straddle type vehicle; and a transition unit configured to cause a control mode of the rear suspension mechanism controlled by the control unit to transition from a first mode of changing the damping force of the rear suspension mechanism according to a detection result of the detector to a second mode of fixing the damping force of the rear suspension mechanism, when the determination unit determines that the straddle type vehicle is in a predetermined operation state, wherein the transition unit is configured to change a transition time spent for transition of the control mode from the first mode to the second mode, depending on a type of the predetermined operation state.

Further features of the present invention will become apparent from the following description of exemplary embodiments with reference to the attached drawings.

BRIEF DESCRIPTION OF THE DRAWINGS

FIG. 1 is a left side view illustrating a straddle type vehicle;

FIG. 3 is a diagram modeling a configuration of a vehicle;

FIG. 4 is a diagram illustrating an example of vibration generated in the vehicle in each operation state;

FIG. 5 is a flowchart illustrating a control method of a rear suspension mechanism;

FIGS. 6A-6B are diagrams for explaining a transition of a control mode in a rear wheel slip state;

FIG. 9 is a flowchart illustrating a determination process of a rear wheel slip state;

FIG. 10 is a flowchart illustrating a determination process of a wheelie state.

DESCRIPTION OF THE EMBODIMENTS

Figure 2:
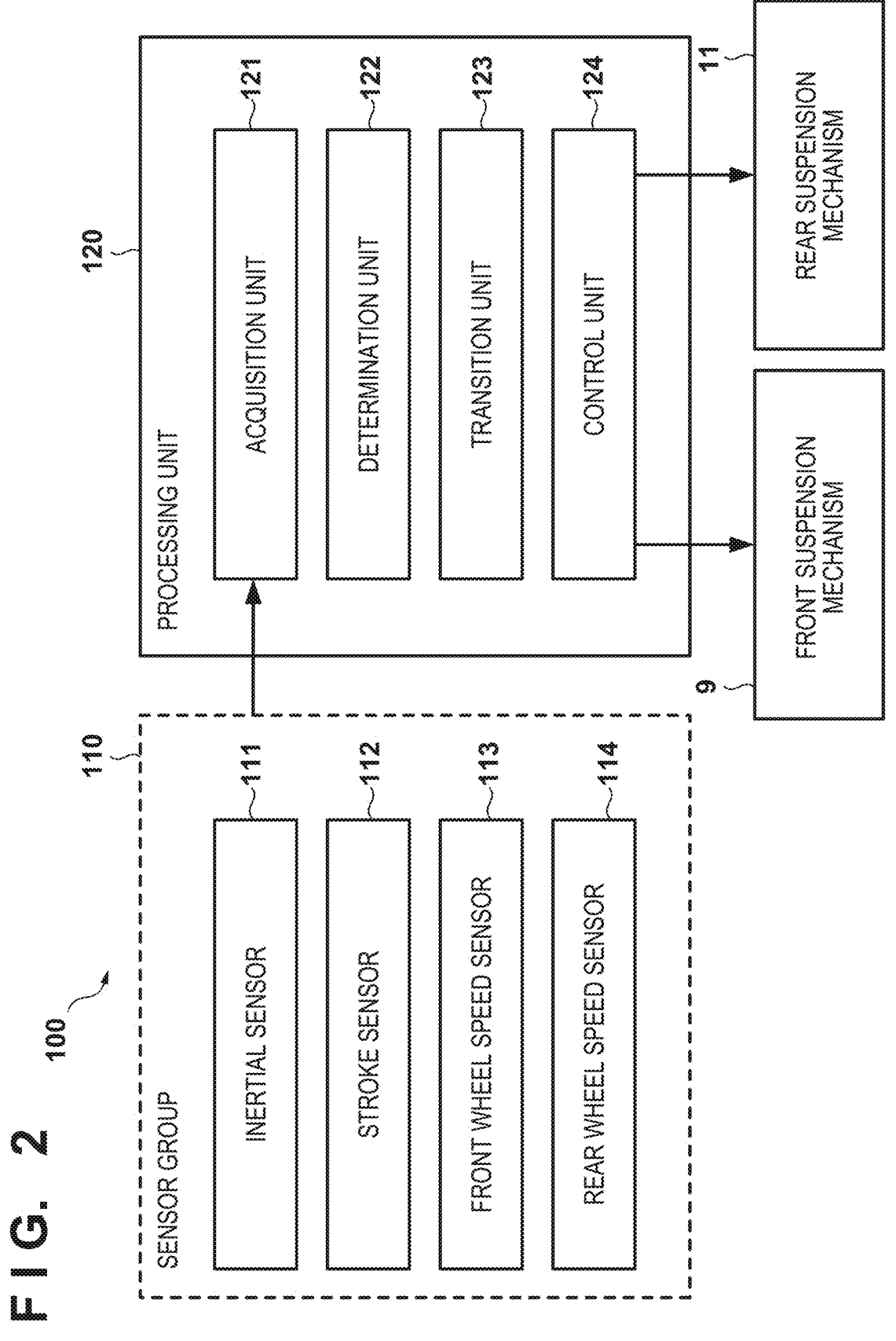
FIG. 2 is a diagram illustrating a configuration example of a control system.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

[Configuration of Straddle Type Vehicle]

Figure 1:
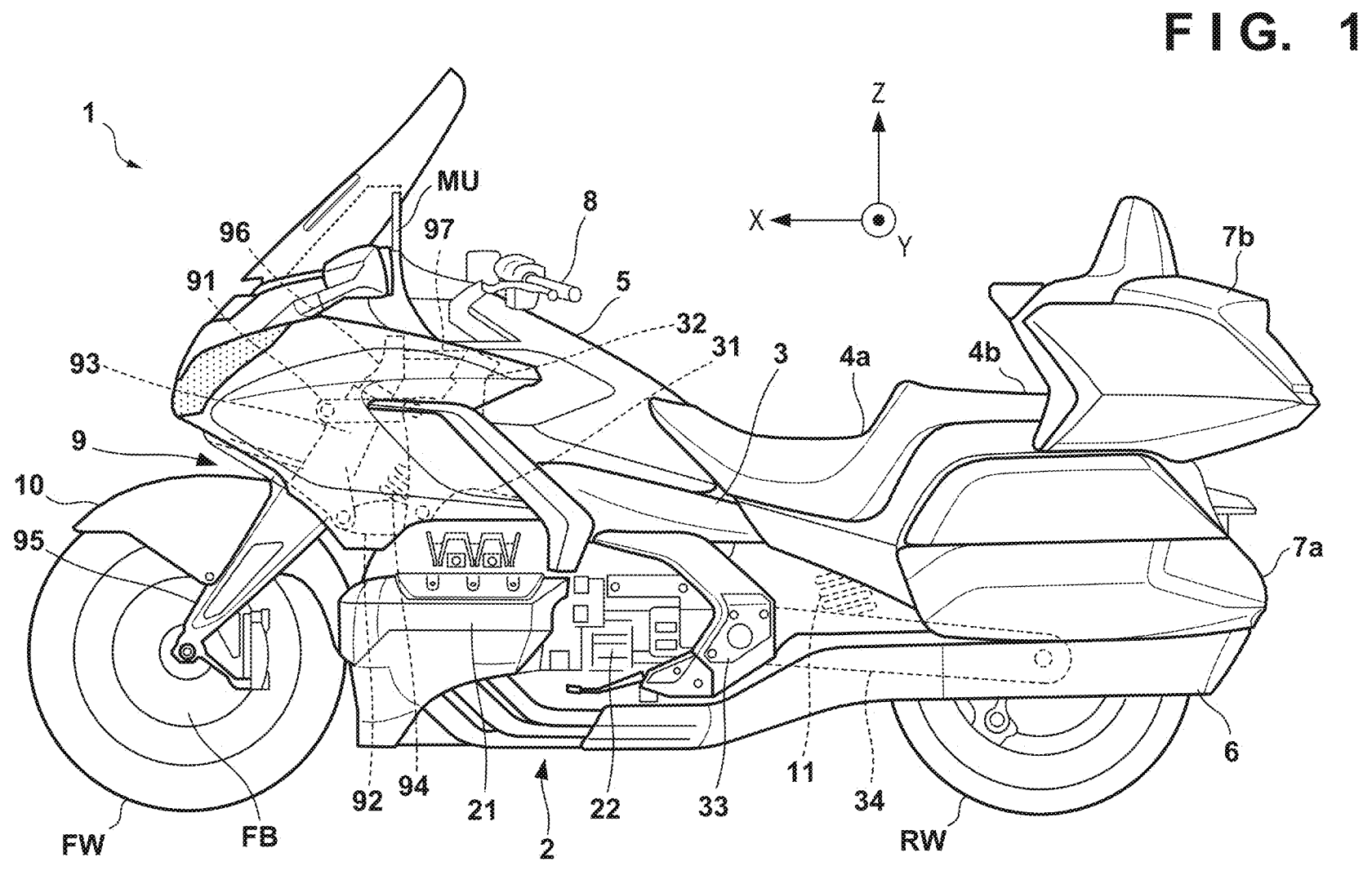

An embodiment according to the present invention will be described. FIG. 1 is a left side view illustrating a straddle type vehicle 1 of the present embodiment. In FIG. 1, arrows X, Y, and Z indicate directions orthogonal to one another. The X direction is a front-and-rear direction of the straddle type vehicle 1, the Y direction is a vehicle width direction (left-and-right direction) of the straddle type vehicle 1, and the Z direction is an up-and-down direction of the straddle type vehicle 1. Hereinafter, an example in which the control system according to the present invention is applied to a motorcycle as the straddle type vehicle 1 will be described. However, the control system according to the present invention is also applicable to other types of straddle type vehicles such as a three-wheeled vehicle, and is also applicable to an electric vehicle using a motor as a drive source in addition to a vehicle using an internal combustion engine as a drive source. Hereinafter, the straddle type vehicle 1 may be referred to as a vehicle 1.

The vehicle 1 includes a front wheel FW, a rear wheel RW, and a power unit 2. The power unit 2 includes an engine 21 and a transmission 22. A driving force of the transmission 22 is transmitted to the rear wheel RW via a drive shaft (not illustrated) to rotate the rear wheel RW.

The power unit 2 is supported by the vehicle body frame 3. The vehicle body frame 3 includes a pair of left and right main frames 31 extending in the X direction. A fuel tank 5 and an air cleaner box (not illustrated) are disposed above the main frames 31. A meter unit MU for displaying various types of information to an occupant (rider) is provided on a front side of the fuel tank 5.

At front side end portions of the main frames 31, a head pipe 32 that rotatably supports a steering shaft (not illustrated) rotated by a handlebar 8 is provided. At a rear end portion of the main frames 31, a pair of left and right pivot plates 33 are provided. Lower end portions of the pivot plates 33 and front end portions of the main frames 31 are connected by a pair of left and right lower arms (not illustrated), and the power unit 2 is supported by the main frames 31 and the lower arms. A pair of left and right seat rails (not illustrated) that extend rearward are also provided at the rear side end portions of the main frames 31, and a seat 4a on which a rider is seated, a seat 4b on which a passenger is seated, a rear trunk 7b, and the like are supported on the seat rails.

A front end portion of a rear swing arm 34 extending in the front-and-rear direction is rotatably attached to the pivot plates 33. A rear wheel RW is rotatably supported by a rear end portion of the rear swing arm 34. The rear swing arm 34 is configured to be swingable in the up-and-down direction by a rear suspension mechanism 11 provided between the rear swing arm 34 and the vehicle body frame 3 (main frame 31). The rear suspension mechanism 11 can be configured as an electronically controlled suspension capable of electronically controlling the damping force. An exhaust muffler 6 that muffles exhaust of the engine 21 extends in the X direction on the side of the rear wheel RW. Left and right saddle backs 7a are provided on the sides of the rear wheel RW.

In the front end portions of the main frames 31, a front suspension mechanism 9, which swingably supports the front wheel FW, is constituted. The front suspension mechanism 9 can be configured as an electronically controlled suspension capable of electronically controlling the damping force. The front suspension mechanism 9 includes an upper link 91, a lower link 92, a fork support body 93, a vibration reduction mechanism 94 (cushion unit), and a pair of left and right front forks 95. In the front suspension mechanism 9, the upper link 91, the lower link 92, the fork support body 93, and the vibration reduction mechanism 94 constitute a support mechanism for supporting the front forks 95 of the vehicle 1.

The upper link 91 and the lower link 92 are vertically disposed at the front end portions of the main frames 31. Rear end portions of the upper link 91 and the lower link 92 are swingably coupled with the front end portions of the main frames 31. The upper link 91 and the lower link 92 are swingably coupled with the fork support body 93.

The fork support body 93 has a tubular shape and is inclined rearward. A steering shaft 96 is supported by the fork support body 93 to be rotatable about the axis of the steering shaft 96. The steering shaft 96 includes a shaft portion (not illustrated) into which the fork support body 93 is inserted. A bridge (not illustrated) is provided in a lower end portion of the steering shaft 96, and the pair of left and right front forks 95 are supported by the bridge. The front forks 95 rotatably support the front wheel FW, and also support a front brake FB. An upper end portion of the steering shaft 96 is coupled with a steering shaft (not illustrated) rotated by the handlebar 8 via a link 97. An upper portion of the front wheel FW is covered with a fender 10, and the fender 10 is supported by the front fork 95.

[Configuration of Control System]

FIG. 2 is a diagram illustrating a configuration example of a control system 100 (control device) of the present embodiment. The control system 100 is a system that controls a suspension mechanism (a front suspension mechanism 9 and a rear suspension mechanism 11) of the vehicle 1, and may include a sensor group 110 and a processing unit 120. Note that the control system 100 may be configured as a system that controls only the rear suspension mechanism 11, or may be configured only by the processing unit 120 without including the sensor group 110.

The sensor group 110 is provided in the vehicle 1 to detect behavior information of the vehicle 1. The behavior information of the vehicle 1 is information indicating the behavior (position, inclination, speed, acceleration, and the like) of the vehicle 1. In the present embodiment, the sensor group 110 may include an inertial sensor 111, a stroke sensor 112, a front wheel speed sensor 113, and a rear wheel speed sensor 114. Each sensor included in the sensor group 110 may be understood as a detector that detects a behavior (information) of vehicle 1.

The inertial sensor 111 includes an inertial measurement unit (IMU), which detects acceleration and an angular velocity generated in the vehicle 1 (vehicle body), and which is thus capable of detecting a behavior of the vehicle 1. The inertial sensor 111 (inertial measurement unit) is disposed at any appropriate position of the vehicle 1, for example, in the vicinity of the center of gravity of the vehicle 1. The inertial sensor 111 detects translational acceleration in each of the X direction (front-and-rear direction), the Y direction (vehicle width direction), and the Z axis direction (up-and-down direction), and detects angular velocity in each of an ωX direction, an ωY direction, and an ωZ direction. The ωX direction is a rotation direction around the X axis (a roll direction), the ωY direction is a rotation direction around the Y axis (a pitch direction), and the ωZ direction is a rotation direction around the Z axis (a yaw direction). In the present embodiment, the inertial sensor 111 can be used to detect acceleration in the X direction (front-and-rear direction) of the vehicle 1, acceleration in the Z direction (up-and-down direction) of the vehicle 1, and a yaw rate (change in yaw angle) of the vehicle 1.

The stroke sensor 112 detects a stroke speed of the front suspension mechanism 9 (front wheel FW) as a state change of the front suspension mechanism 9. The stroke sensor 112 may be configured to detect a stroke displacement (stroke amount) of the front suspension mechanism 9 (front wheel FW). In the vehicle 1 of the present embodiment, the stroke sensor 112 is only provided in the front suspension mechanism 9, and the stroke sensor is not provided in the rear suspension mechanism 11. As a result, the vehicle cost can be reduced.

The front wheel speed sensor 113 detects a wheel speed of the front wheel FW of the vehicle 1. In the case of the present embodiment, the front wheel speed sensor 113 can be used to calculate the speed of the front wheel FW (which may be referred to hereinafter as a front wheel speed) in the vehicle 1. The rear wheel speed sensor 114 detects a wheel speed of the rear wheel RW of the vehicle 1. In the case of the present embodiment, the rear wheel speed sensor 114 can be used to calculate the speed of the rear wheel RW (which may be referred to hereinafter as a rear wheel speed) in the vehicle 1.

The processing unit 120 is, for example, an electronic control unit (ECU), and may include a computer including a processor represented by a CPU, a storage device such as a semiconductor memory, and an interface with external devices. The storage device (memory) of the processing unit 120 stores an application program (hereinafter referred to as a control program in some cases) for controlling the front suspension mechanism 9 and rear suspension mechanism 11 of the vehicle 1, and the processor of the processing unit 120 can read and execute the control program stored in the storage device. The control program includes a program for controlling the damping force of the rear suspension mechanism 11 by controlling the current value supplied to the rear suspension mechanism 11. In addition, the control program may be stored in a storage medium such as a CD-ROM, a DVD, or a memory to be installed in the processing unit 120 from the storage medium, or may be downloaded from an external server through a network to be installed in the processing unit 120.

The processing unit 120 of the present embodiment may include an acquisition unit 121, a determination unit 122, a transition unit 123, and a control unit 124. The acquisition unit 121, the determination unit 122, the transition unit 123, and the control unit 124 are units for executing various functions of the processing unit 120, and may be configured by one processor or may be configured by different processors.

The acquisition unit 121 acquires behavior information of the vehicle 1 from the sensor group 110 (each sensor 111 to 114). The determination unit 122 determines the operation state of vehicle 1. For example, the determination unit 122 determines whether the vehicle 1 is in a predetermined operation state. In the case of the present embodiment, the determination unit 122 determines whether a predetermined operation state has been started in the vehicle 1 and/or whether a predetermined operation condition has ended in the vehicle 1. The determination by the determination unit 122 can be performed on the basis of the behavior information of the vehicle 1 acquired from the sensor group 110 by the acquisition unit 121. Here, the predetermined operation state is a state of the vehicle 1 in which it is difficult to estimate the stroke speed that may occur in the rear suspension mechanism 11 based on the stroke speed of the front suspension mechanism 9 detected by the stroke sensor 112. In the present embodiment, as the predetermined operation state, the rear wheel slip state in which the rear wheel RW of the vehicle 1 slips and the wheelie state where the vehicle 1 is doing a wheelie will be described as an example, but other states of the vehicle 1 may be included in the predetermined operation state.

When the determination unit 122 determines that the vehicle 1 is in the predetermined operation state, the transition unit 123 changes the control mode of the rear suspension mechanism 11 controlled by the control unit 124. In the case of the present embodiment, the transition unit 123 changes the control mode of the rear suspension mechanism 11 controlled by the control unit 124 when the determination unit 122 determines that the predetermined operation state has been started and/or when the determination unit 122 determines that the predetermined operation state has ended. In addition, the control unit 124 controls the damping force of the front suspension mechanism 9 and the rear suspension mechanism 11. In the case of the present embodiment, the control unit 124 controls the damping force of the front suspension mechanism 9 and the rear suspension mechanism 11 by controlling the current value supplied to the front suspension mechanism 9 and the rear suspension mechanism 11. Specifically, from the viewpoint of improving steering stability and riding comfort of the vehicle 1, the control unit 124 performs so-called skyhook control of controlling (adjusting) the damping force of the front suspension mechanism 9 and the rear suspension mechanism 11 using a skyhook theory assuming a state where the vehicle 1 (vehicle body or the like) is suspended in midair by a virtual line.

Here, the control unit 124 of the present embodiment can include a first mode and a second mode as control modes of the rear suspension mechanism 11. The first mode is a mode in which the damping force of the rear suspension mechanism 11 is changed according to the stroke speed of the front suspension mechanism 9 detected by the stroke sensor 112. That is, the first mode is a mode in which the current value supplied to the rear suspension mechanism 11 is changed according to the stroke speed of the front suspension mechanism 9 detected by the stroke sensor 112. Specifically, in the first mode, the stroke speed that can occur in the rear suspension mechanism 11 is estimated based on the stroke speed of the front suspension mechanism 9 detected by the stroke sensor 112, and the current value supplied to the rear suspension mechanism 11 is controlled (changed) based on the estimation result. The control of the rear suspension mechanism 11 in the first mode may be understood as the skyhook control. On the other hand, in the second mode, the damping force of the rear suspension mechanism 11 is fixed regardless of the stroke speed of the front suspension mechanism 9 detected by the stroke sensor 112. That is, the second mode is a mode for fixing a current value to be supplied to the rear suspension mechanism 11, in other words, a mode for supplying a fixed current to the rear suspension mechanism 11.

In addition, when the determination unit 122 determines that the predetermined operation state has been started, the transition unit 123 of the present embodiment causes the control mode of the rear suspension mechanism 11 controlled by the control unit 124 to transition from the first mode to the second mode. In addition, when the determination unit 122 determines that the predetermined operation state has ended, the transition unit 123 causes the control mode of the rear suspension mechanism 11 controlled by the control unit 124 to transition from the second mode to the first mode. Hereinafter, the control mode of the rear suspension mechanism 11 controlled by the control unit 124 may be simply referred to as a "control mode".

FIG. 3 is a diagram modeling a configuration (front suspension mechanism 9 and rear suspension mechanism 11) of the vehicle 1 in the present embodiment. The front suspension mechanism 9 and the rear suspension mechanism 11 are mechanisms for reducing vibration transmitted from a road surface RS to the vehicle body BD of the vehicle 1. The front suspension mechanism 9 includes an elastic member 9a and a viscous damper 9b. Similarly, the rear suspension mechanism 11 includes an elastic member 11a and a viscous damper 11b.

The elastic members 9a and 11a are members having a spring constant. A spring or rubber is used as the elastic members 9a and 11a, and a coil spring can be used in the present embodiment. In addition, the viscous dampers 9b and 11b are, although its detailed illustration is omitted, a mono-tube type components and may include a magneto-rheological fluid (MRF) as the hydraulic oil. A piston rod is slidably inserted in an axial direction into a cylinder having a tubular shape filled with the MRF, and the inside of the cylinder is partitioned into an upper oil chamber and a lower oil chamber by a piston attached to a tip end of the piston rod. When an electric current is supplied to a coil located inside a communication passage that communicates the upper oil chamber with the lower oil chamber, a magnetic field is applied to the MRF, which flows in the communication passage, and ferromagnetic particles form clusters. This changes the viscosity of the MRF, which passes through the communication passage, so that the damping force of the viscous dampers 9b and 11b can be changed. That is, the control unit 124 can control (adjust) the damping force of the suspension mechanisms 9 and 11 by changing the viscosity of the magnetic fluid inside the viscous dampers 9b and 11b by controlling the current value supplied to the coils of the viscous dampers 9b and 11b.

Here, the viscous dampers 9b and 11b are not limited to the mechanism using the magneto-rheological fluid (MRF), and may be a mechanism that changes the amount of oil (hydraulic oil) passing through the orifice by changing the diameter of the orifice with an actuator such as a step motor to adjust the damping force. In this case, the control unit 124 can control (adjust) the damping force of the suspension mechanisms 9 and 11 by changing the amount of oil passing through the orifice by changing the diameter of the orifice of the viscous dampers 9b and 11b by controlling the current value supplied to the actuator. A mechanism for controlling (adjusting) the damping force of the suspension mechanisms 9 and 11 may be a mechanism using a linear solenoid. In this case, the control unit 124 can control (adjust) the damping force of the suspension mechanisms 9 and 11 by controlling the current value supplied to the linear solenoid.

In the control system 100 of the present embodiment, a stroke sensor 112 is provided in the front suspension mechanism 9, and the control unit 124 controls the front suspension mechanism 9 on the basis of a detection result (that is, the stroke speed detected by the stroke sensor 112) of the stroke sensor 112. On the other hand, if the stroke sensor is provided for the rear suspension mechanism 11, it may be disadvantageous in terms of vehicle cost. Therefore, the control unit 124 estimates the stroke speed that can occur in the rear suspension mechanism 11 based on the stroke speed of the front suspension mechanism 9 detected by the stroke sensor 112 and the on-spring motion detected by the inertial sensor (IMU), and controls the rear suspension mechanism 11 based on the estimation result.

In the straddle type vehicle 1, in a predetermined operation state such as a rear wheel slip state or a wheelie state, it may be difficult to estimate the stroke speed that may occur in the rear suspension mechanism 11 based on the detection result of the stroke speed of the front suspension mechanism 9. In such a case, if the rear suspension mechanism 11 is controlled based on the detection result of the stroke speed of the front suspension mechanism 9, the vehicle body stability of the vehicle 1 may be rather deteriorated. Therefore, when it is determined that the predetermined operation state is started in the vehicle 1, the control system 100 of the present embodiment transitions the control mode of the rear suspension mechanism 11 from the first mode to the second mode, and fixes the current value to be supplied to the rear suspension mechanism 11. In addition, even if the control mode of the rear suspension mechanism 11 is steeply transitioned from the first mode to the second mode, the current value supplied to the rear suspension mechanism 11 rapidly increases or decreases, an impact is generated in the vehicle 1, and the vehicle body stability of the vehicle 1 may be deteriorated. Therefore, in the control system 100 of the present embodiment, a transition time to be spent for the transition of the control mode from the first mode to the second mode is provided, and the control mode is gradually transitioned from the first mode to the second mode over the transition time.

Here, the transition time is preferably determined according to the vibration cycle of the vehicle 1. If the number of vibration cycles included in the transition time is too large, although it is difficult to estimate the stroke speed of the rear suspension mechanism 11 based on the stroke speed of the front suspension mechanism 9, control of the rear suspension mechanism 11 in the first mode is performed for an unnecessarily long period of time. On the other hand, if the number of vibration cycles included in the transition time is too small, the control mode of the rear suspension mechanism 11 steeply transitions from the first mode to the second mode, and an impact is generated in the vehicle 1.

Figure 4:
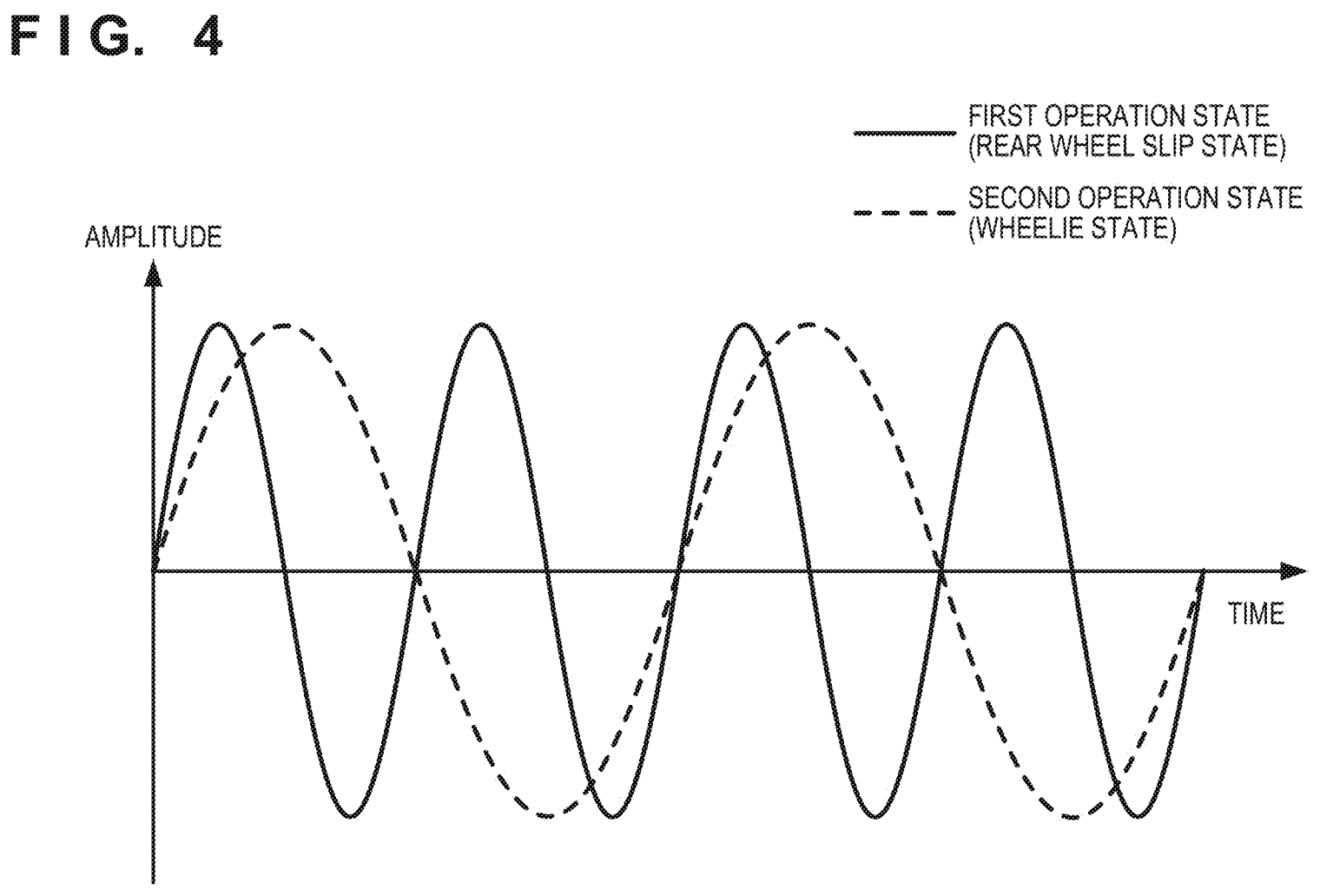

However, the vibration cycle (vibration frequency) of the vehicle 1 may vary depending on the type of the predetermined operation state. For example, in the vehicle 1, a portion below the suspension mechanisms 9 and 11 is defined as a lower spring portion, and a portion above the suspension mechanisms 9 and 11 is defined as an upper spring portion. In this case, the type of the predetermined operation state may include a first operation state in which the vibration of the lower spring portion is larger than the vibration of the upper spring portion, and a second operation state in which the vibration of the upper spring portion is larger than the vibration of the lower spring portion. The first operation state may be understood as a state in which the vibration is mainly in the lower spring portion, and is, for example, a rear wheel slip state. In the first operation state, as illustrated in FIG. 4, the vibration cycle of the vehicle 1 becomes relatively short. On the other hand, the second operation state may be understood as a state in which the vibration is mainly in the upper spring portion, and is, for example, a wheelie state. In the second operation state, as illustrated in FIG. 4, the vibration cycle of the vehicle 1 becomes relatively long. FIG. 4 illustrates an example of vibration generated in the vehicle 1 in each of the first operation state (rear wheel slip state) and the second operation state (wheelie state).

Therefore, the control system 100 of the present embodiment changes the transition time spent for changing the control mode of the rear suspension mechanism 11 depending on the type of the predetermined operation state. Specifically, the control system 100 of the present embodiment changes the transition time between the first operation state and the second operation state. Hereinafter, a control method of the rear suspension mechanism 11 in the present embodiment will be described by exemplifying the rear wheel slip state as the first operation state and the wheelie state as the second operation state.

[Control Method of Rear Suspension Mechanism]

FIG. 5 is a flowchart illustrating a control method of the rear suspension mechanism 11 in the present embodiment. The flowchart of FIG. 5 may be performed by the processing unit 120. The flowchart of FIG. 5 starts when the ignition of the vehicle 1 is turned on, for example, and may be repeatedly executed until the ignition of the vehicle 1 is turned off. That is, when step S110 ends, the processing is started again from step S101.

In step S101, the processing unit 120 (control unit 124) controls the rear suspension mechanism 11 in the first mode. That is, the processing unit 120 changes the current value to be supplied to the rear suspension mechanism 11 according to the stroke speed of the front suspension mechanism 9 detected by the stroke sensor 112.

In step S102, the processing unit 120 (acquisition unit 121) acquires behavior information of the vehicle 1 from the sensor group 110 (each sensor 111 to 114). In the case of the present embodiment, the processing unit 120 can acquire the speed and the angular velocity (yaw rate) occurring in the vehicle 1 from the inertial sensor 111, the wheel speed of the front wheel FW from the front wheel speed sensor 113, and the wheel speed of the rear wheel RW from the rear wheel speed sensor 114 as the behavior information of the vehicle 1.

In step S103, the processing unit 120 (determination unit 122) determines whether or not a predetermined operation state has been started in the vehicle 1 on the basis of the behavior information of the vehicle 1 acquired in step S102. In the present embodiment, the type of the predetermined operation state in the vehicle 1 includes a rear wheel slip state and a wheelie state. When it is determined that the predetermined operation state has not been started in the vehicle 1, the process returns to step S101, and when it is determined that the predetermined operation state has been started, the process proceeds to step S104. Note that a specific determination method for determining whether or not the predetermined operation state has been started in step S103 will be described below.

In step S104, the processing unit 120 (transition unit 123) determines a transition time (hereinafter, it may be referred to as a first transition time) to be spent for transitioning the control mode of the rear suspension mechanism 11 from the first mode to the second mode. In the present embodiment, the processing unit 120 changes the first transition time depending on the type of the predetermined operation state (rear wheel slip state or wheelie state) in the vehicle 1. The processing unit 120 can change the first transition time depending on the type of the predetermined operation state such that the first transition time is shorter in the rear wheel slip state (first operation state) than in the wheelie state (second operation state). When determining the first transition time, processing unit 120 changes an index value used to change the first transition time, among a plurality of types of index values included in the behavior information acquired in step S102, depending on the type of the predetermined operation state of vehicle 1. Examples of the plurality of types of index values include speed, angular velocity (yaw rate), front wheel speed, and rear wheel speed acquired as behavior information of the vehicle 1.

First, an example in which the predetermined operation state in the vehicle 1 is the rear wheel slip state will be described. In the rear wheel slip state, the processing unit 120 determines the first transition time using the yaw rate of the vehicle 1 as the index value. Specifically, the processing unit 120 determines a slip coefficient from the yaw rate acquired in step S102 on the basis of the information indicating the relationship between the yaw rate and the slip coefficient of the vehicle 1 illustrated in FIG. 6A. As a result, the processing unit 120 can determine the first transition time by the following Equation (1). FIG. 6B illustrates an example of transition between the first mode and the second mode in the rear wheel slip state.

$$\text{First Transition Time} = \text{Slip Coefficient} \times 10\,[\text{msec}] \quad (1)$$

Here, the slip coefficient is a coefficient used to determine the first transition time in the rear wheel slip state, and is set to be smaller as the yaw rate is larger. That is, the processing unit 120 can determine the first transition time such that the first transition time becomes shorter as the yaw rate increases. This is because, in the rear wheel slip state, the larger the yaw rate, the lower the vehicle body stability of the vehicle 1. Therefore, it is preferable that the larger the yaw rate, the more quickly the control mode of the rear suspension mechanism 11 is transitioned from the first mode to the second mode. Note that the relationship between the yaw rate and the slip coefficient of the vehicle 1 can be set in advance by simulation, experiment, or the like.

Figure 7A:
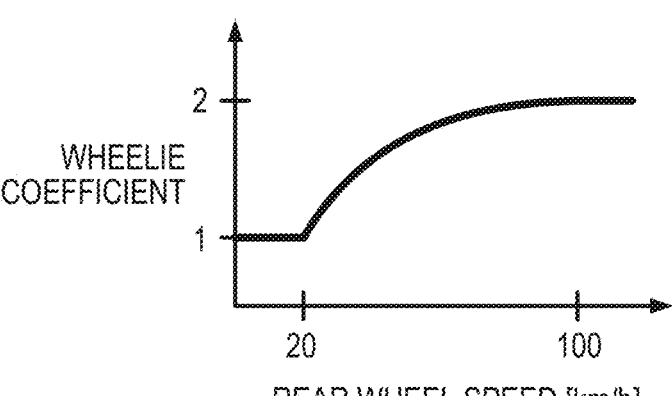
FIGS. 7A-7B are diagrams for explaining a transition of a control mode in a wheelie state.
Figure 7B:
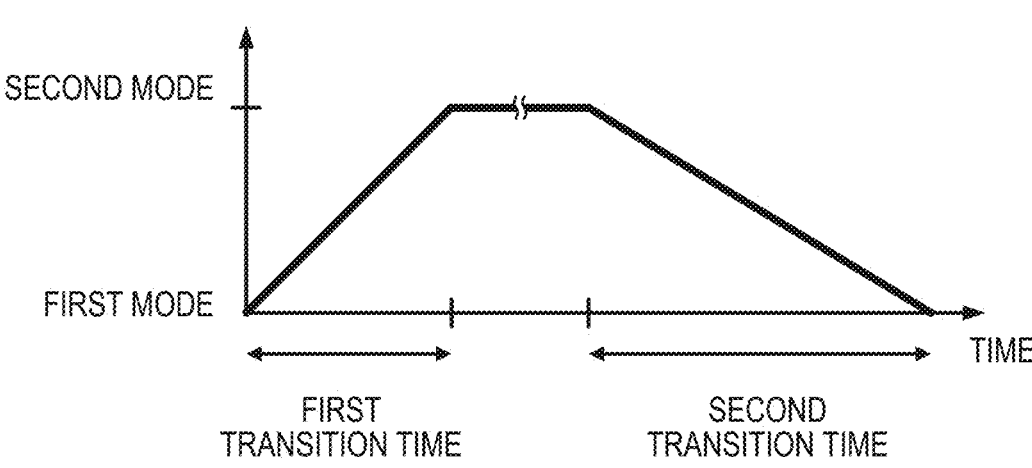

Next, an example in which the predetermined operation state in the vehicle 1 is the wheelie state will be described. In the wheelie state, the processing unit 120 determines the first transition time using the rear wheel speed as the index value. As described above, the rear wheel speed is the speed of the rear wheel RW, and can be calculated from the detection result of the rear wheel speed sensor 114. Specifically, the processing unit 120 determines the wheelie coefficient from the rear wheel speed on the basis of the information indicating the relationship between the rear wheel speed and the wheelie coefficient illustrated in FIG. 7A. As a result, the processing unit 120 can determine the first transition time by the following Equation (2). FIG. 7B illustrates an example of transition between the first mode and the second mode in the wheelie state.

$$\text{First Transition Time} = \text{Wheelie Coefficient} \times 50\,[\text{msec}] \quad (2)$$

Here, the wheelie coefficient is a coefficient used to determine the first transition time in the wheelie state, and is set to decrease as the rear wheel speed decreases. That is, the processing unit 120 can determine the first transition time such that the first transition time becomes shorter as the rear wheel speed (the wheel speed of the rear wheel RW) decreases. This is because, in the wheelie state, when the rear wheel speed (that is, the vehicle speed) is low, the wheelie behavior of the vehicle 1 is likely to occur, and thus, it is preferable to cause the control mode of the rear suspension mechanism 11 to transition from the first mode to the second mode more quickly as the rear wheel speed is low. Note that the relationship between the rear wheel speed and the wheelie coefficient can be set in advance by simulation, experiment, or the like.

Returning to FIG. 5, in step S105, the processing unit 120 (transition unit 123) gradually transitions the control mode of the rear suspension mechanism 11 from the first mode to the second mode at the first transition time determined in step S104. As described above, the first transition time is determined by a different method depending on the type (rear wheel slip state or wheelie state) of the predetermined operation state in the vehicle 1. Therefore, as illustrated in FIGS. 6(b) and 7(b), the first transition time can be changed between the rear wheel slip state and the wheelie state.

In step S106, the processing unit 120 (control unit 124) controls the rear suspension mechanism 11 in the second mode. That is, the processing unit 120 fixes the current value to be supplied to the rear suspension mechanism 11 regardless of the stroke speed of the front suspension mechanism 9 detected by the stroke sensor 112.

In step S107, the processing unit 120 (acquisition unit 121) acquires behavior information of the vehicle 1 from the sensor group 110 (each sensor 111 to 114). Next, in step S108, the processing unit 120 (determination unit 122) determines whether or not a predetermined operation state has ended in the vehicle 1 on the basis of the behavior information of the vehicle 1 acquired in step S107. When it is determined that the predetermined operation state has not ended in the vehicle 1, the process returns to step S107, and when it is determined that the predetermined operation state has ended, the process proceeds to step S109.

In step S109, the processing unit 120 (transition unit 123) determines a transition time (hereinafter, it may be referred to as a second transition time) to be spent for transitioning the control mode of the rear suspension mechanism 11 from the second mode to the first mode. In the present embodiment, the processing unit 120 changes the second transition time depending on the type (rear wheel slip state or wheelie state) of the predetermined operation state in the vehicle 1.

Specifically, when the predetermined operation state is the rear wheel slip state, the processing unit 120 determines the second transition time to be a first value (for example, 100 [msec]). On the other hand, in a case where the predetermined operation state is the wheelie state, the processing unit 120 determines the second transition time to be a second value (for example, 200 [msec]) different from the first value. That is, the processing unit 120 can change the second transition time depending on the type of the predetermined operation state such that the second transition time is shorter in the rear wheel slip state (first operation state) than in the wheelie state (second operation state).

Here, the reason for changing the second transition time depending on the type of the predetermined operation state is similar to the above-described reason for changing the first transition time depending on the type of the predetermined operation state. That is, similarly to the first transition time, the second transition time is preferably determined according to the vibration cycle of the vehicle 1. As a result, the vehicle body stability of the vehicle 1 when returning from the predetermined operation state to the normal state can be improved. In the present embodiment, the second transition time is set to a fixed value for each predetermined operation state, but the second transition time may be determined such that the second transition time changes according to an index value such as a yaw rate or a rear wheel speed, similarly to the first transition time.

In step S110, the processing unit 120 (transition unit 123) gradually transitions the control mode of the rear suspension mechanism 11 from the second mode to the first mode at the second transition time determined in step S109. As illustrated in FIGS. 6(*b*) and 7(*b*), the second transition time can be changed depending on the type (rear wheel slip state or wheelie state) of the predetermined operation state in the vehicle 1.

[Determination of Start of Predetermined Operation State]

Figure 8:
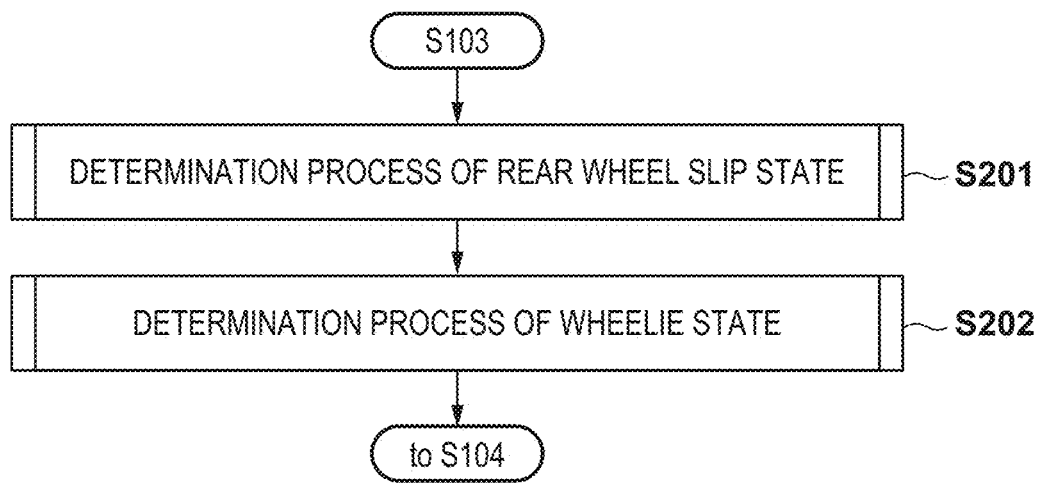
FIG. 8 is a flowchart illustrating a method of determining start of a predetermined operation state.

Next, a method of determining whether or not a predetermined operation state has been started in step S103 will be described. FIG. 8 is a flowchart illustrating a method of determining the start of a predetermined operation state. Here, an example in which only the rear wheel slip state and the wheelie state are determined as the predetermined operation state will be described.

In step S201, the processing unit 120 (determination unit 122) performs a determination process of the rear wheel slip state. Furthermore, in step S202, the processing unit 120 (determination unit 122) performs a determination process of the wheelie state. Note that the order of steps S201 to S202 is not limited to the example of FIG. 8, and the determination process of the wheelie state may be performed before the determination process of the rear wheel slip state.

The determination process of the rear wheel slip state in step S201 of FIG. 8 can be performed according to the flowchart of FIG. 9. In the determination process of the rear wheel slip state, the wheel speed of the front wheel FW and the wheel speed of the rear wheel RW acquired as the behavior information of the vehicle 1 in step S102 of FIG. 5 can be used.

In step S301, the processing unit 120 calculates a rear wheel slip ratio based on the wheel speed of the front wheel FW and the wheel speed of the rear wheel RW. The rear wheel slip ratio is an index indicating how much the rear wheel RW is slipping, and can be calculated by the following Equation (3).

$$\text{Rear Wheel Slip Ratio} = \quad (3)$$
$$(\text{Wheel Speed Difference between Front and}$$
$$\text{Rear Wheels/Wheel Speed of Rear Wheel } RW) * 100$$

In step S302, the processing unit 120 determines whether or not the rear wheel slip ratio is larger than a threshold. The threshold is set so that it can be determined that the rear wheel RW to which the power from the power unit 2 is transmitted is slipping, and the processing unit 120 can determine that the rear wheel RW is slipping when the rear wheel slip ratio is larger than the threshold. If the rear wheel slip ratio is larger than the threshold, the process proceeds to step S303. On the other hand, when the rear wheel slip ratio is equal to or less than the threshold, the process proceeds to step S309, and the processing unit 120 determines that the operation state of the vehicle 1 is not the rear wheel slip state.

In step S303, the processing unit 120 calculates a wheel speed buffering value of the front wheel FW based on the wheel speed of the front wheel FW. Next, in step S304, the processing unit 120 calculates the wheel speed buffering value of the rear wheel RW based on the wheel speed of the rear wheel RW. The wheel speed buffering value is a differential value with respect to a data group of the wheel speed of the wheel (front wheel FW and rear wheel RW) obtained in a certain time (for example, one second), and can be used to confirm whether the rotation of the wheel is accelerated or decelerated.

In step S305, the processing unit 120 determines whether the rear wheel lock is generated based on the wheel speed buffering value of the front wheel FW and the wheel speed buffering value of the rear wheel RW. The rear wheel lock is a state in which the rear wheel RW is locked and is not rotating. When it is determined that the rear wheel lock has occurred, the process proceeds to step S308, and the processing unit 120 determines that the operation state of the vehicle 1 is the rear wheel slip state. On the other hand, when it is determined that the rear wheel lock has not occurred, the process proceeds to step S306.

In step S306, the processing unit 120 determines whether or not a rear wheel acceleration slip has occurred based on the wheel speed buffering value of the front wheel FW and the wheel speed buffering value of the rear wheel RW. The rear wheel acceleration slip is a state in which the rear wheel RW is accelerated with respect to the front wheel FW. When it is determined that the rear wheel acceleration slip has occurred, the process proceeds to step S308, and the processing unit 120 determines that the operation state of the vehicle 1 is the rear wheel slip state. On the other hand, when it is determined that no rear wheel acceleration slip has occurred, the process proceeds to step S307.

In step S307, the processing unit 120 determines whether or not the front wheel FW is slipping based on the wheel speed buffering value of the front wheel FW and the wheel speed buffering value of the rear wheel RW. Specifically, when the front wheel FW is not accelerated with respect to the rear wheel RW, it can be determined that the front wheel FW is not slipping. When it is determined that the front wheel FW is not slipping, the process proceeds to step S308, and the processing unit 120 determines that the operation state of the vehicle 1 is the rear wheel slip state. On the other hand, when it is determined that the front wheel FW is slipping, the process proceeds to step S309, and the processing unit 120 determines that the operation state of the vehicle 1 is not the rear wheel slip state.

The determination process of the rear wheel slip state in step S202 of FIG. 8 can be performed according to the flowchart of FIG. 10. In the determination process of the rear wheel slip state, the longitudinal acceleration, the vertical acceleration, the wheel speed of the front wheel FW, and the wheel speed of the rear wheel RW acquired as the behavior information of the vehicle 1 in step S102 of FIG. 5 can be used. Here, the longitudinal acceleration is acceleration generated in the vehicle 1 in a direction parallel to the front-and-rear direction (vehicle body axis) of the vehicle 1, and can be obtained from a detection result of the inertial sensor 111. In addition, the vertical acceleration is acceleration generated in the vehicle 1 in a direction (up-and-down direction) perpendicular to the front-and-rear direction (vehicle body axis) of the vehicle 1, and can be obtained from a detection result of the inertial sensor 111.

In step S401, the processing unit 120 calculates a front wheel slip ratio based on the wheel speed of the front wheel FW and the wheel speed of the rear wheel RW. The front wheel slip ratio is an index indicating how much the front wheel FW is slipping, and can be calculated by the following Equation (4).

$$\text{Front Wheel Slip Ratio} = \tag{4}$$
$$(\text{Wheel Speed Difference between Front and}$$
$$\text{Rear Wheels/Wheel Speed of Front Wheel } FW) * 100$$

In step S402, the processing unit 120 determines whether or not the front wheel slip ratio is smaller than a threshold. The threshold is set so that it can be determined that the front wheel FW to which the power from the power unit 2 is not transmitted is slipping, and the processing unit 120 can determine that the front wheel FW is slipping when the front wheel slip ratio is smaller than the threshold. When the front wheel slip ratio is smaller than the threshold, the process proceeds to step S403. On the other hand, when the front wheel slip ratio is equal to or greater than the threshold value, the process proceeds to step S411, and the processing unit 120 determines that the operation state of the vehicle 1 is not the wheelie state.

In step S403, the processing unit 120 calculates the wheel speed buffering value of the front wheel FW based on the wheel speed of the front wheel FW. Next, in step S404, the processing unit 120 calculates the wheel speed buffering value of the rear wheel RW based on the wheel speed of the rear wheel RW. Since steps S403 to S404 are steps similar to steps S303 to S304 in FIG. 9 described above, the description thereof is omitted here.

In step S405, the processing unit 120 determines whether the rotation of the front wheel FW is decelerated and the rotation of the rear wheel RW is accelerated based on the wheel speed buffering value of the front wheel FW and the wheel speed buffering value of the rear wheel RW. In the wheelie state, normally, the rotation of the front wheel FW to which the power from the power unit 2 is not transmitted tends to decelerate because the front wheel FW is not in contact with the ground, and the rotation of the rear wheel RW to which the power from the power unit 2 is transmitted tends to accelerate to lift the front portion of the vehicle 1. When it is determined that the rotation of the front wheel FW is decelerated and the rotation of the rear wheel RW is accelerated, the process proceeds to step S406, and otherwise, the process proceeds to step S411.

In step S406, the processing unit 120 calculates the acceleration of the vehicle 1 in the front-and-rear direction (front-and-rear direction of the vehicle body) based on the longitudinal acceleration. Next, in step S407, the processing unit 120 determines whether the vehicle 1 is accelerating on the basis of the acceleration of the vehicle 1 calculated in step S406. In order to lift the front portion of the vehicle 1 to bring the vehicle 1 into the wheelie state, it is necessary to accelerate the vehicle 1. If it is determined that the vehicle 1 is accelerating, the process proceeds to step S408, otherwise the process proceeds to step S411.

In step S408, the processing unit 120 calculates wheelie axis acceleration. Next, in step S409, the processing unit 120 determines whether or not the wheelie axis acceleration calculated in step S408 is smaller than a specified value. The wheelie axis acceleration is an index for determining whether or not the vehicle 1 is doing a wheelie based on the force (acceleration) generated in the vehicle 1. For example, the processing unit 120 can calculate wheelie axis acceleration Aw by the following Equation (5).

$$Aw = Az\cos\theta + Ax\sin(-\theta) \tag{5}$$

Figure 11A:
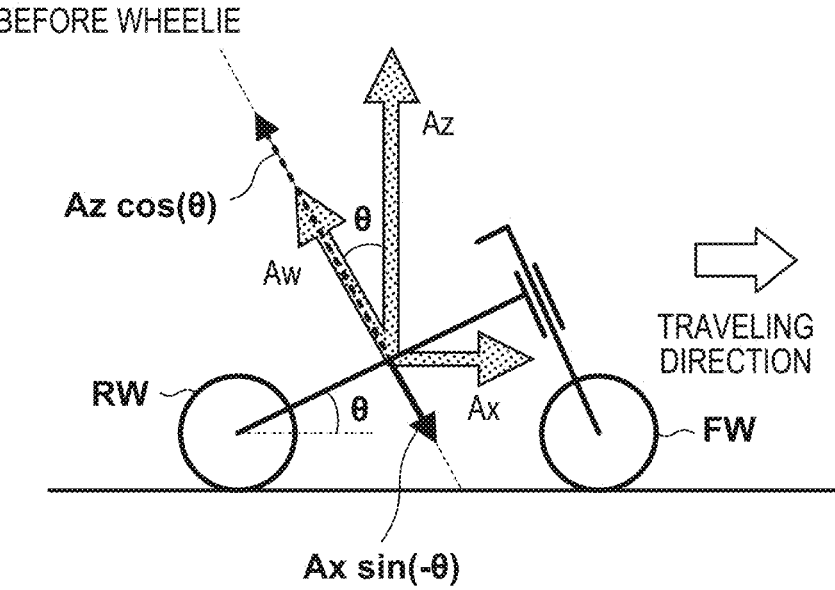
FIGS. 11A-11B are diagrams for explaining each parameter value used for calculation of wheelie axis acceleration.
Figure 11B:
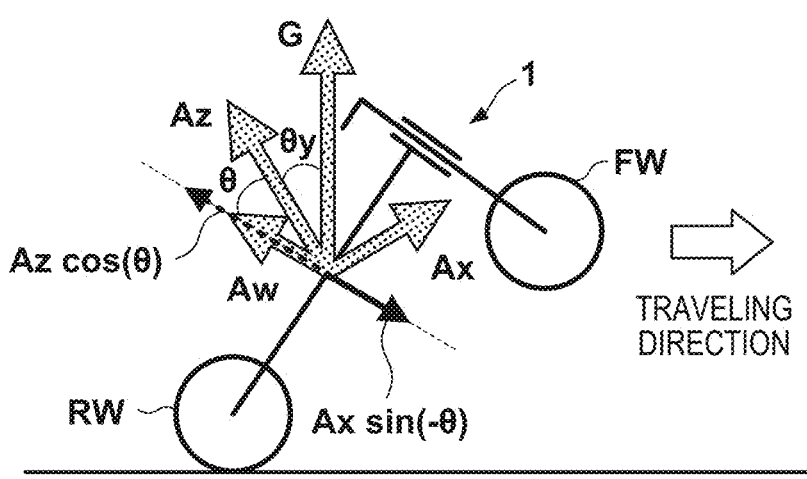

Each parameter value used in Equation (5) will be described with reference to FIGS. 11A-11B. FIG. 11A illustrates a state before wheelie, and FIG. 11B illustrates a state during wheelie. In Equation (5), "AW" is the wheelie axis acceleration and indicates the acceleration generated at the center of gravity of the vehicle 1 in the direction perpendicular to a line connecting the rotation axis of the rear wheel RW and the center of gravity of the vehicle 1. "0" indicates an angle formed by a line connecting the rotation axis of the rear wheel RW and the center of gravity of the vehicle 1 and a line connecting the rotation axis of the rear wheel RW and the rotation axis of the front wheel FW. "Ax" indicates acceleration (longitudinal acceleration) generated at the center of gravity of the vehicle 1 in the front-and-rear direction of the vehicle 1. "Az" indicates acceleration (vertical acceleration) generated at the center of gravity of the vehicle 1 in the up-and-down direction of the vehicle 1.

When the vehicle 1 does a wheelie, the vehicle 1 suddenly accelerates, so that the longitudinal acceleration Ax increases, and the attitude of the vehicle 1 changes, so that the vertical acceleration Az decreases. As a result, the wheelie axis acceleration Aw decreases. Therefore, in a case where the wheelie axis acceleration Aw is smaller than the specified value, the processing unit 120 proceeds to step S410, and can determine that the operation state of the vehicle 1 is the wheelie state. On the other hand, when the wheelie axis acceleration Aw is equal to or greater than the specified value, the process proceeds to step S411, and the processing unit 120 determines that the operation state of the vehicle 1 is not the wheelie state.

As described above, the control system 100 of the present embodiment changes the control mode of the rear suspension mechanism 11 between the first mode and the second mode according to whether or not the vehicle 1 is in a predetermined operation state (for example, the rear wheel slip state and the wheelie state). The first mode is a mode in which the current value supplied to the rear suspension mechanism 11 is changed according to the stroke speed of the front suspension mechanism 9 detected by the stroke sensor 112. The second mode is a mode in which the current value supplied to the rear suspension mechanism 11 is fixed regardless of the stroke speed of the front suspension mechanism 9 detected by the stroke sensor 112. Then, the control system 100 changes the transition time (first transition time and second transition time) spent for changing the control mode of the rear suspension mechanism 11 depending on the type of the predetermined operation state. According to the control system 100 of the present embodiment, the vehicle body stability can be improved even when the straddle type vehicle 1 is in a predetermined operation state.

SUMMARY OF EMBODIMENTS

1. A control system according to the above embodiments is
   a control system (e.g. 100) of a straddle type vehicle (e.g. 1) including a front suspension mechanism (e.g. 9) and a rear suspension mechanism (e.g. 11), characterized by comprising:
   detection means (e.g. 112) for detecting a stroke speed of the front suspension mechanism;
   control means (e.g. 124) for controlling a damping force of the rear suspension mechanism;
   determination means (e.g. 122) for determining an operation state of the straddle type vehicle; and
   transition means (e.g. 123) for causing a control mode of the rear suspension mechanism controlled by the control means to transition from a first mode of changing the damping force of the rear suspension mechanism according to a detection result of the detection means to a second mode of fixing the damping force of the rear suspension mechanism, when the determination means determines that the straddle type vehicle is in a predetermined operation state,
   wherein the transition means changes a transition time spent for transition of the control mode from the first mode to the second mode, depending on a type of the predetermined operation state.
   According to this embodiment, when the straddle type vehicle is in a predetermined operation state such as the rear wheel slip state or the wheelie state, the current value supplied to the rear suspension mechanism is fixed, and the transition time is appropriately changed for each type of the predetermined operation state having a different vibration frequency. Therefore, the vehicle body stability of the straddle type vehicle in the predetermined operation state can be improved.
2. In the above embodiments,
   in the straddle type vehicle, assuming that a lower side than the front suspension mechanism and the rear suspension mechanism is a lower spring portion and an upper side than them is an upper spring portion, the type of the predetermined operation state includes a first operation state in which vibration of the lower spring portion is larger than vibration of the upper spring portion and a second operation state in which the vibration of the upper spring portion is larger than the vibration of the lower spring portion, and
   the transition means changes the transition time depending on the type of the predetermined operation state such that the transition time is shorter in the first operation state than in the second operation state.
   According to this embodiment, in the first operation state in which the vibration is mainly in the relatively light lower spring portion, the change in the vehicle body state is faster (that is, the vibration frequency is higher) than in the second operation state, and the number of times of the damping is increased. Therefore, the transition time can be shortened, and the vehicle body vibration can be suppressed more quickly. On the other hand, in the second operation state in which the vibration is mainly in the relatively heavy upper spring portion, the change in the vehicle body state is slower than that in the first operation state (that is, the vibration frequency is lower), and it is unclear whether the vehicle body state actually changes even if the vehicle body state temporarily changes. Therefore, the transition time can be made as long as possible to more appropriately determine whether to transition to the second mode. That is, since the transition time is appropriately changed depending on the type of the predetermined operation state classified by the vibration relationship between the lower spring portion and the upper spring portion, the vehicle body stability of the straddle type vehicle in the predetermined operation state can be improved.
3. In the above embodiments,
   the first operation state is a rear wheel slip state in which a rear wheel of the straddle type vehicle is slipping, and
   the second operation state is a wheelie state in which the straddle type vehicle is doing a wheelie.
   According to this embodiment, in the rear wheel slip state in which the vibration is mainly in the relatively light lower spring portion, the change in the vehicle body state is faster (that is, the vibration frequency is higher) than in the wheelie state, and the number of times of the damping is increased. Therefore, the transition time is shortened, and the vehicle body vibration can be suppressed more quickly. On the other hand, in the wheelie state in which the vibration is mainly in the relatively heavy upper spring portion, the change in the vehicle body state is slower (that is, the vibration frequency is low) than in the rear wheel slip state, and it is unclear whether the vehicle body state actually changes even if the vehicle body state temporarily changes. Therefore, the transition time can be made as long as possible to more appropriately determine whether to transition to the second mode. That is, since the transition time is appropriately changed depending on the type of the predetermined operation state such as the rear wheel slip state or the wheelie state, the vehicle body stability of the straddle type vehicle that is the predetermined operation state can be improved.
4. In the above embodiments,
   the control system further comprises:
   acquisition means (e.g. 121) for acquiring information from a sensor group (e.g. 110) provided in the straddle type vehicle,
   wherein the transition means changes the transition time based on the information acquired by the acquisition means, for each type of the predetermined operation state.
   According to this embodiment, the transition time can be appropriately changed (determined) for each type of predetermined operation state.
5. In the above embodiments,
   the transition means change an index value used to change the transition time, among a plurality of types of index values included in the information acquired by the acquisition means, depending on the type of the predetermined operation state. According to this embodiment, the transition time can be appropriately changed using the index value depending on the type of the predetermined operation state.
6. In the above embodiments,
   the type of the predetermined operation state includes a rear wheel slip state in which a rear wheel of the straddle type vehicle slips, the sensor group includes a first sensor (e.g. 111) that detects a yaw rate of the straddle type vehicle, and when the determination means determines that the rear wheel slip state has been started, the transition means determines the transition time based on the yaw rate acquired from the first sensor by the acquisition means.

According to this embodiment, the transition time can be appropriately changed using the index value (yaw rate of the straddle type vehicle) depending on the type of the predetermined operation state (rear wheel slip state).

7. In the above embodiments, when the determination means determines that the rear wheel slip state has been started, the transition means determines the transition time such that the transition time becomes shorter as the yaw rate acquired from the first sensor by the acquisition means increases.

According to this embodiment, in the rear wheel slip state in which the vehicle body stability of the straddle type vehicle decreases as the yaw rate increases, the control mode of the rear suspension mechanism can be transitioned from the first mode to the second mode more quickly when the yaw rate is large than when the yaw rate is small.

8. In the above embodiments, the type of the predetermined operation state includes a wheelie state in which the straddle type vehicle is doing a wheelie, the sensor group includes a second sensor (e.g. 114) that detects a wheel speed of a rear wheel of the straddle type vehicle, and when the determination means determines that the wheelie state has been started, the transition means determines the transition time based on the wheel speed acquired from the second sensor by the acquisition means.

According to this embodiment, the transition time can be appropriately changed using the index value (the wheel speed of the rear wheel of the straddle type vehicle) depending on the type of the predetermined operation state (the wheelie state).

9. In the above embodiments, when the determination means determines that the wheelie state has been started, the transition means determines the transition time such that the transition time becomes shorter as the wheel speed acquired from the second sensor by the acquisition means decreases.

According to this embodiment, in the wheelie state in which the vehicle body stability of the straddle type vehicle decreases as the rear wheel speed decreases, the control mode of the rear suspension mechanism can be transitioned from the first mode to the second mode more quickly when the rear wheel speed is low than when the rear wheel speed is high.

10. In the above embodiments, the determination means further determines whether or not the predetermined operation state has ended in the straddle type vehicle, and when the determination means determines that the predetermined operation state has ended, the transition means causes the control mode to transition from the second mode to the first mode, and change a second transition time spent for transition of the control mode from the second mode to the first mode, depending on the type of the predetermined operation state.

According to this embodiment, the second transition time required to return the control mode of the rear suspension mechanism from the second mode to the first mode is appropriately changed for each type of the predetermined operation state. Therefore, it is possible to improve the vehicle body stability of the straddle type vehicle when returning from the predetermined operation state to the normal state.

11. In the above embodiments, in the straddle type vehicle, assuming that a lower side than the front suspension mechanism and the rear suspension mechanism is a lower spring portion and an upper side than them is an upper spring portion, the type of the predetermined operation state includes a first operation state in which vibration of the lower spring portion is larger than vibration of the upper spring portion and a second operation state in which the vibration of the upper spring portion is larger than the vibration of the lower spring portion, and the transition means changes the second transition time depending on the type of the predetermined operation state such that the second transition time is shorter in the first operation state than in the second operation state.

According to this embodiment, in the first operation state in which the vibration is mainly in the relatively light lower spring portion, the change in the vehicle body state is faster (that is, the vibration frequency is higher) than in the second operation state, and the number of times of the damping is increased. Therefore, the transition time can be shortened, and the vehicle body vibration can be suppressed more quickly. On the other hand, in the second operation state in which the vibration is mainly in the relatively heavy upper spring portion, the change in the vehicle body state is slower than that in the first operation state (that is, the vibration frequency is lower), and it is unclear whether the vehicle body state actually changes even if the vehicle body state temporarily changes. Therefore, the transition time can be made as long as possible to more appropriately determine whether to transition to the second mode. That is, since the second transition time is appropriately changed depending on the type of the predetermined operation state classified by the vibration relationship between the lower spring portion and the upper spring portion, the vehicle body stability of the straddle type vehicle when returning from the predetermined operation state to the normal state can be improved.

12. In the above embodiments, the first operation state is a rear wheel slip state in which a rear wheel of the straddle type vehicle is slipping, and the second operation state is a wheelie state in which the straddle type vehicle is doing a wheelie.

According to this embodiment, since the second transition time is appropriately changed depending on the type of the predetermined operation state such as the rear wheel slip state or the wheelie state, the vehicle body stability of the straddle type vehicle when returning from the predetermined operation state to the normal state can be improved.

The invention is not limited to the foregoing embodiments, and various variations/changes are possible within the spirit of the invention.

What is claimed is:

1. A control system of a straddle type vehicle including a front suspension mechanism and a rear suspension mechanism, comprising:

a detector configured to detect a stroke speed of the front suspension mechanism;

a controller configured to control a damping force of the rear suspension mechanism; and at least one processor with a memory comprising instructions, that when executed by the at least one processor, cause the at least one processor to:

determine an operation state of the vehicle; and transition a control mode of the rear suspension mechanism controlled by the controller from a first mode to a second mode, when determining that the operation state of the vehicle is a first state in which a rear wheel of the vehicle is slipping or a second state in which the vehicle is doing a wheelie, wherein the first mode is a mode of changing the damping force of the rear suspension mechanism according to a detection result of the detector, and the second mode is a mode of fixing the damping force of the rear suspension mechanism, wherein the at least one processor is configured to change a transition time spent for transition of the control mode from the first mode to the second mode, depending on the operation state.

2. The control system according to claim 1, wherein the instructions, when executed by the at least one processor, further cause the at least one processor to change the transition time depending on the operation state such that the transition time is shorter in the first operation state than in the second operation state.

3. The control system according to claim 1, wherein the instructions, when executed by the at least one processor, further cause the at least one processor to:

acquire information from a sensor group provided in the vehicle, and change the transition time based on the acquired information, for each operation state.

4. The control system according to claim 3, wherein the instructions, when executed by the at least one processor, further cause the at least one processor to change an index value used to change the transition time, among a plurality of types of index values included in the acquired information, depending on the operation state.

5. The control system according to claim 3, wherein the sensor group includes a first sensor configured to detect a yaw rate of the vehicle, and the instructions, when executed by the at least one processor, further cause the at least one processor to, when determining that the first state has been started, determine the transition time based on the yaw rate acquired from the first sensor.

6. The control system according to claim 5, wherein the instructions, when executed by the at least one processor, further cause the at least one processor to, when determining that the first state has been started, determine the transition time such that the transition time becomes shorter as the yaw rate acquired from the first sensor increases.

7. The control system according to claim 3, wherein the sensor group includes a second sensor configured to detect a wheel speed of a rear wheel of the vehicle, and the instructions, when executed by the at least one processor, further cause the at least one processor to, when determining that the second state has been started, determine the transition time based on the wheel speed acquired from the second sensor.

8. The control system according to claim 7, wherein the instructions, when executed by the at least one processor, further cause the at least one processor to, when determining that the second state has been started, determine the transition time such that the transition time becomes shorter as the wheel speed acquired from the second sensor decreases.

9. The control system according to claim 1, wherein the instructions, when executed by the at least one processor, further cause the at least one processor to:

determine whether or not the first state or the second state has ended in the vehicle, and when determining that the first state or the second state has ended, transition the control mode from the second mode to the first mode, and change a second transition time spent for transition of the control mode from the second mode to the first mode, depending on the operation state.

10. The control system according to claim 9, wherein the instructions, when executed by the at least one processor, further cause the at least one processor to change the second transition time depending on the operation state such that the second transition time is shorter in the first operation state than in the second operation state.

11. A straddle type vehicle comprising the control system according to claim 1.

12. A control method for controlling a damping force of a rear suspension mechanism in a straddle type vehicle including a front suspension mechanism and the rear suspension mechanism, comprising:

detecting a stroke speed of the front suspension mechanism;

determining an operation state of the straddle type vehicle; and transitioning a control mode of the rear suspension mechanism from a first mode to a second mode, when determining that the operation state of the straddle type vehicle is a first state in which a rear wheel of the vehicle is slipping or a second state in which the vehicle is doing a wheelie, wherein the first mode is a mode of changing the damping force of the rear suspension mechanism according to a detection result in the detecting, and the second mode is a mode of fixing the damping force of the rear suspension mechanism, and wherein, in the transitioning, a transition time spent for transition of the control mode from the first mode to the second mode is changed depending on the operation state.

13. A non-transitory computer-readable storage medium storing a program for causing a computer to execute a control method according to claim 12.

\* \* \* \* \*